United States Patent [19]
Alfieri et al.

[11] 4,217,532
[45] Aug. 12, 1980

[54] ELECTRICALLY BRAKED ALTERNATING CURRENT MOTOR WITH PLURAL, ALTERNATIVELY ENERGIZABLE BRAKE WINDINGS

[76] Inventors: Robert L. Alfieri, 6123 Cambridge Ave., Cincinnati, Ohio 45230; James D. Grice, 4452 Greenwich Village Ave., Dayton, Ohio 45406; William D. Greene, 5430 David Dr., Tipp City, Ohio 45371

[21] Appl. No.: 877,954

[22] Filed: Feb. 15, 1978

[51] Int. Cl.² ............................................. H02P 1/40
[52] U.S. Cl. ................................................ 318/759
[58] Field of Search ............... 318/757, 759, 563, 564, 318/751

[56] References Cited

U.S. PATENT DOCUMENTS

| | | | |
|---|---|---|---|
| 2,828,457 | 3/1958 | Noodleman | 318/759 |
| 2,906,935 | 9/1959 | Martin | 318/759 |
| 3,335,347 | 8/1967 | Carlstedt | 318/751 |
| 3,462,660 | 8/1969 | Barltrop | 318/564 |

*Primary Examiner*—Gene Z. Rubinson
*Attorney, Agent, or Firm*—Wood, Herron & Evans

[57] ABSTRACT

An electrically braked alternating current motor includes a first, or primary, brake winding that is normally energizable to brake the motor and at least a second, or backup, brake winding that is alternatively energizable with the first brake winding to electrically brake the motor if the first brake winding fails.

8 Claims, 5 Drawing Figures

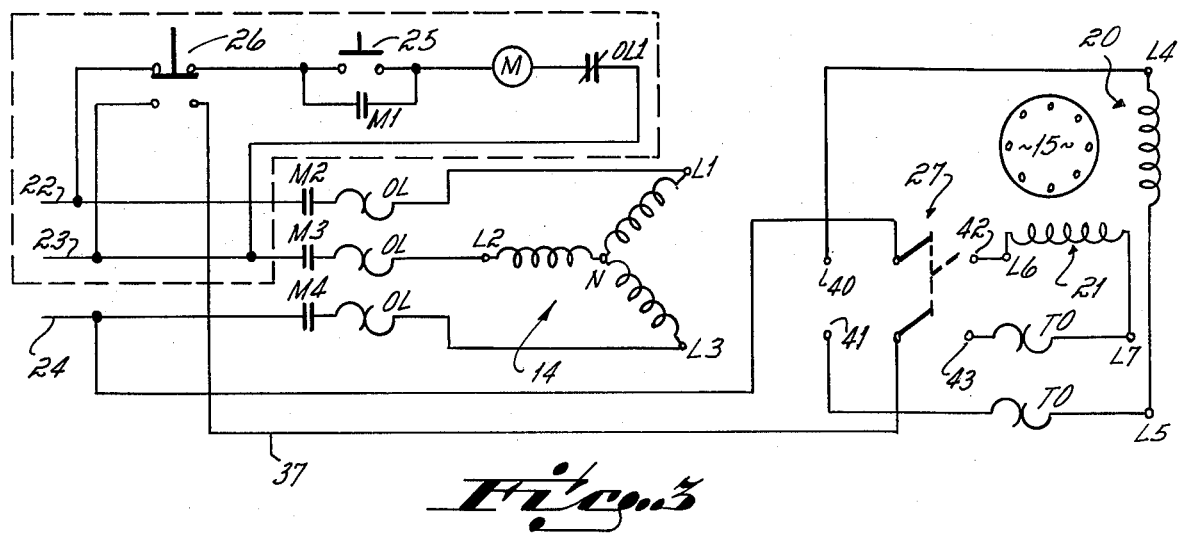
Fig. 3
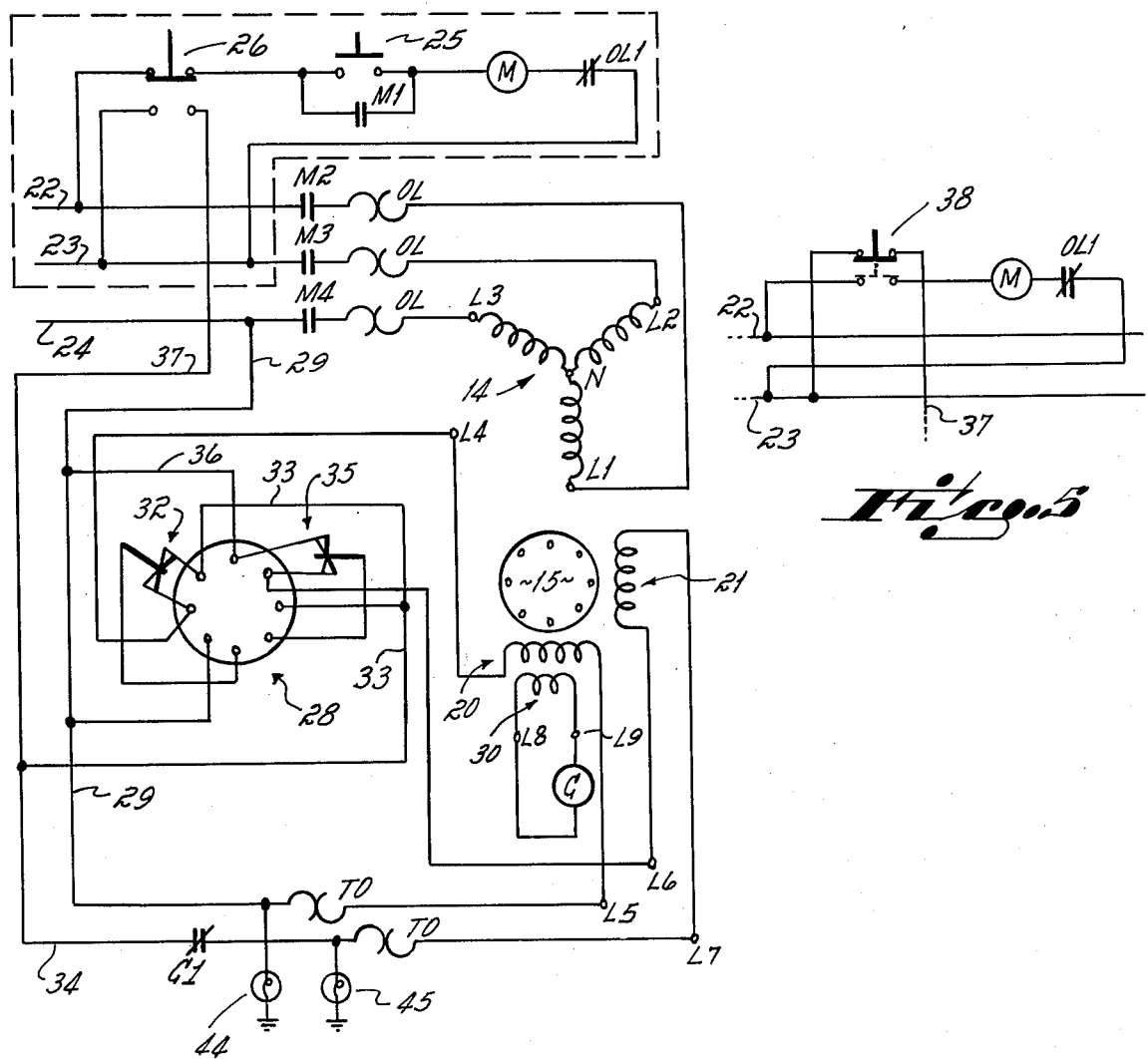
Fig. 5
Fig. 4

ELECTRICALLY BRAKED ALTERNATING CURRENT MOTOR WITH PLURAL, ALTERNATIVELY ENERGIZABLE BRAKE WINDINGS

BACKGROUND OF THE INVENTION

This invention relates to electric motors, and, more particularly, to electrically braked alternating current motors.

The prior art is replete with disclosures for electrically braked alternating current motors. For example, Noodleman, U.S. Pat. No. 2,627,059, discloses an electrically braked alternating current motor having a first single phase brake winding wound in the slots of the alternating current motor stator with the run winding and so arranged that the brake winding forms a greater number of poles than the run winding. The larger the number of poles formed by the brake winding, the greater will be its effectiveness in braking the motor.

Also in accordance with U.S. Pat. No. 2,627,059, two single phase brake windings are provided, which are phase displaced by 90°, with one of the brake windings having a capacitor or short circuit thereacross. While an increase in braking effect is produced by a second, capacitor-shunted or short-circuited brake winding, should the first brake winding fail, such as due to burn out from overheating, the alternating current motor can no longer be electrically braked.

Voege, U.S. Pat. No. 2,808,552, discloses an electrically braked reversible alternating motor current motor which includes a main brake winding and an auxiliary brake winding. The circuit control means includes a reversing switch to energize the auxiliary brake winding in accordance with the direction of rotation of the reversible alternating current motor, the main brake winding and the auxiliary brake winding being simultaneously energizable to produce the braking effect. If either the main brake winding or the auxiliary brake winding fails, however, such as due to burn out from overheating, the electrical braking effect can no longer be produced.

Experience has shown that the normal life expectancy of a brake winding, such as included in the above-cited prior art electrically braked motors, is approximately one year. Stated differently, the brake winding incorporated in prior art electrically braked alternating current motors can be expected to burn out on the average of approximately once a year. When the brake winding fails, the alternating current motor can no longer be electrically braked, and must be replaced. The resulting downtime can cause significant economic loss. For example, if the motor were employed as a drive on an assembly line or machine tool, production would have to be shut down until such time as the brake winding was replaced or a different motor substituted. Even if downtime could be tolerated until time was found to repair or substitute, yearly replacement of the brake winding results in a high maintenance cost.

SUMMARY OF THE INVENTION

Broadly, the present invention is directed to an extended life electrically braked alternating current motor which requires less maintenance and downtime. The present invention accomplishes this result by providing an alternating current motor with at least two brake windings, each of which when energized alone is capable of braking the motor, and a circuit control means for alternatively selectively energizing one of the brake windings such that if another brake winding has failed, the motor can still be electrically braked.

The present invention in a preferred embodiment includes an alternating current motor having a stator and a rotor. A selectively energizable run winding is wound on the stator and arranged to form a given number of poles. A winding, such as a squirrel cage winding, is also provided on the rotor, and the rotor is rotatably mounted with respect to the stator. A first circuit control means is provided for selectively energizing the run winding so that the stator drives the rotor for rotation when the run winding alone is energized.

Also, a first, or primary, selectively energizable brake winding is wound on the stator and arranged to form a greater number of poles than the number of poles formed by the run winding. In addition, at least a second, or backup, selectively energizable brake winding capable of braking the motor is wound on the stator and arranged to form a greater number of poles than the number of poles formed by the run winding. A second circuit control means for alternatively energizing one of the brake windings is provided so that the stator electrically brakes the rotor regardless of which one of the brake windings is energized.

In one embodiment, the second circuit control means includes a manual control by which an operator selects the brake winding that is energized to electrically brake the alternating current motor. If the selected brake winding should fail, the operator can then manipulate the second circuit control means to select one of the other brake windings. In another embodiment, the second circuit control means includes an automatic changeover circuit to switch from a first brake winding to a second brake winding in the event of failure of the first brake winding. In the latter embodiment, preferably, indicator means is provided to display which of the brake windings is energized to electrically brake the alternating current motor.

The advantages of providing at least two alternatively energizable brake windings, each of which if energized can brake the motor, is that, if one brake winding fails, for example, burns out from overheating, the other brake winding is available to electrically brake the alternating current motor. This avoids the need to immediately take the alternating current motor out of service to replace the burned-out brake winding or to substitute another alternating current motor. In essence, the life of the alternating current motor, if such is considered to be the normal life of a single brake winding, is multiplied by the number of additional alternatively energizable brake windings by virtue of having the additional, or backup, brake windings which can be utilized in the event one brake winding fails. Existing, as well as new, alternating current motors can be provided with alternatively energizable brake windings, and the cost for providing the additional brake windings is nominal, that is, only slightly more than providing only a single brake winding. Where indicator means is included, the indicator means advantageously informs the operator that a brake winding has failed so that replacement of the brake winding can be scheduled during a period of time when the alternating current motor is not in use.

BRIEF DESCRIPTION OF THE DRAWINGS

The present invention will be better understood by those of skill in the art and the advantages of the present invention will be better appreciated by a consideration of the drawings in connection with the detailed description which appears below. In the drawings:

FIG. 3 is a schematic diagram for a circuit control means for manually controlling energization of the windings in the schematic diagram of FIG. 2;

FIG. 4 is a schematic diagram for another circuit control means for manually controlling energization of the windings in the schematic diagram of FIG. 2; and FIG. 5 is a schematic diagram for a modified form for the circuit control means in FIGS. 3 and 4.

DESCRIPTION

Figure 1:
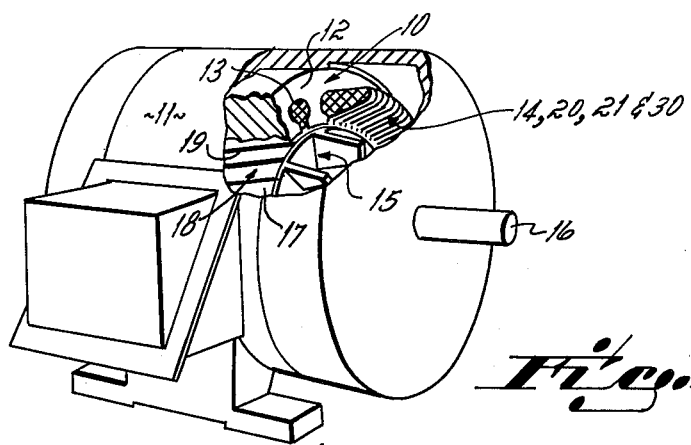
FIG. 1 shows a three-phase, squirrel cage alternating current induction motor which incorporates the features of the present invention.

For purposes of the description, the present invention will be applied to a conventional three-phase, wye-connected, squirrel cage alternating current induction motor as shown in FIG. 1. The present invention, however, is equally applicable to other types of dynamoelectric machines, such as motors having any number of phases, including split-phase motors and capacitor-start motors, delta-connected motors, multi-speed motors and motors having wound rotors. The present invention is even applicable to generators where it is desired to apply an electrical braking effect.

The alternating current motor in FIG. 1 includes a stator 10 mounted in a motor frame 11. The stator 10 is provided with a stator core 12 having a plurality of slots $13_1, 13_2, \ldots 13_n$.

A selectively energizable run winding 14 is wound on the stator 10. The run winding 14 is wound in the slots $13_1, 13_2, \ldots 13_n$ of the stator to form a given number of poles.

The alternating current motor in FIG. 1 also includes a rotor 15 which is rotatably mounted with respect to the stator 10. The rotor 15, for example, may be mounted on a motor shaft 16 which is journaled in the motor frame 11.

The rotor 15 is provided with a rotor core 17. A squirrel cage winding 18, which comprises conductors 19 interconnected at the ends, as by a ring, is mounted around the periphery of the rotor core 17.

The alternating current motor in FIG. 1 as so far described is conventional. When the run winding 14 of the stator 10 is energized, a magnetic field is produced by current in the run winding 14. This magnetic field induces current in the squirrel cage winding 18 which produces another magnetic field. The interaction of the stator 10 and rotor 15 magnetic fields drives the rotor 15 for rotation.

In accordance with the present invention, plural brake windings, for example, two brake windings, are also wound on the stator 10. A first, or primary, brake winding 20 and at least a second, or backup, brake winding 21 are wound in the slots $13_1, 13_2, \ldots 13_n$ of the stator 10. Preferably, the primary and backup brake windings 20 and 21 are wound in the slots $13_1, 13_2, \ldots 13_n$ of the stator core 12 in such a way that current is not induced therein by the magnetic field produced when the run winding 14 of the stator 10 is energized. Normally, this is accomplished by providing an even number of poles for each of the primary and backup brake windings 20 and 21 for each pole of the run winding 14.

Each of the primary and backup brake windings 20 and 21 is arranged to form a larger number of poles than the given number of poles formed by the run winding 14. The larger the number of poles established by each of the primary and backup brake windings 20 and 21, the greater will be the braking effect when either of the primary or backup brake windings 20 or 21 is energized.

By virtue of this arrangement of the run winding 14 and the primary and backup brake windings 20 and 21, the speed of the alternating current motor in FIG. 1 when energized solely by the run winding 14 may be several times as great as the speed of the alternating current motor in FIG. 1 when energized solely by either of the primary or backup brake windings 20 or 21. Consequently, a switchover from energization of the run winding 14 to energization of either of the primary or backup brake windings 20 or 21 will immediately produce a braking effect so as to rapidly decelerate the alternating current motor.

Figure 2:
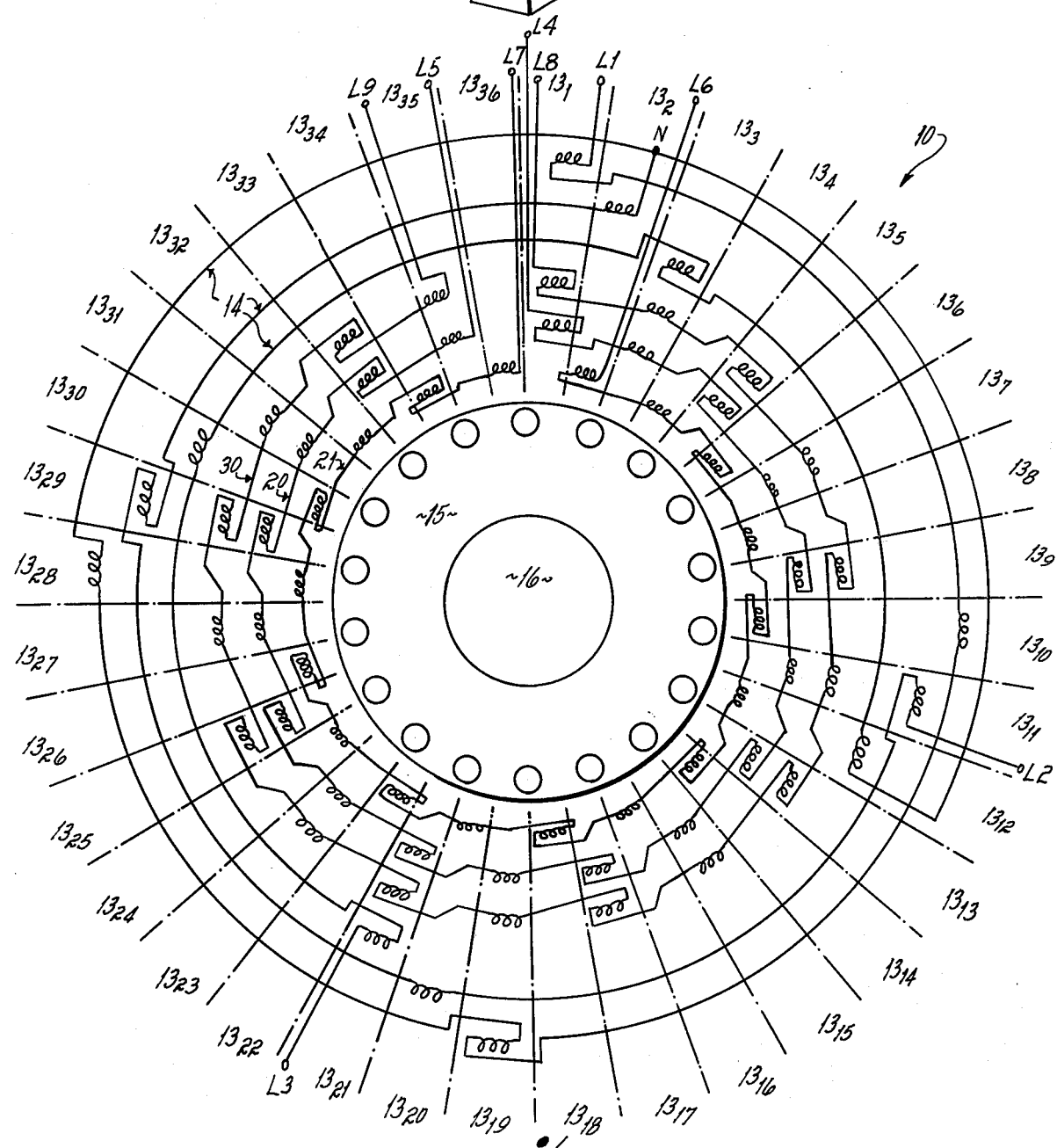
FIG. 2 is a schematic diagram which shows the winding arrangement in accordance with the present invention for the alternating current motor in FIG. 1.

Having described the general configuration and principle of operation for an alternating current motor having plural brake windings in accordance with the present invention, reference will now be made to FIG. 2 which shows a schematic diagram for a three-phase, wye-connected squirrel cage alternating current induction motor having two brake windings, including a primary brake winding and a backup brake winding. As shown in FIG. 2, the run winding 14 comprises a three-phase, wye-connected winding L1, L2, L3. The stator core of stator 10, for example, has 36 slots $13_1, 13_2, \ldots 13_{36}$. As shown in FIG. 2, each of the windings L1, L2, L3 is wound on the stator 10 to form four poles. The winding L1, for example, is wound in the slots $13_1, 13_{10}, 13_{19}$ and $13_{28}$. The winding L2 is wound in the slots $13_2, 13_{11}, 13_{20}$ and $13_{29}$. The winding L3 is wound in the slots $13_3, 13_{12}, 13_{21}$ and $13_{30}$.

With this arrangement of the windings L1, L2, L3 which form the run winding 14, the primary brake winding 20 is wound in the odd-numbered slots $13_1, 13_3, \ldots 13_{35}$. The backup brake winding 21 is wound in the even-numbered slots $13_2, 13_4, \ldots 13_{36}$. With the configuration for the run winding 14 and the primary and backup brake windings 20 and 21 shown in FIG. 2, no current is induced in the primary and backup brake windings 20 and 21 when the run winding 14 is energized.

Each of the primary and backup brake windings 20 and 21 forms eighteen poles compared to the four poles formed by each of the windings L1, L2, L3 which form the run winding 14. Consequently, when either of the primary or backup brake windings 20 or 21 is energized, a braking effect is produced to rapidly decelerate rotation of the rotor 15 from the speed produced by energization of the run winding 14.

In accordance with the present invention, the primary and backup brake windings 20 and 21 are alternatively energizable. That is, only one of the primary and backup brake windings 20 and 21 is energized at a time to stop the alternating current motor. The advantage of providing plural, alternatively energizable brake windings, such that if one brake winding fails, for example, burns out from overheating, another brake winding is available for use, is that this avoids the need to immediately take the alternating current motor out of service for the purpose of replacing the burned out brake winding when only one of the brake windings fails. In essence, the life of the alternating current motor, if such is considered to be the normal life of a single brake winding, is multiplied by the number of brake windings in excess of one by virtue of having backup brake windings which can be utilized in the event that one brake winding fails.

In accordance with the present invention, a control circuit is provided for selectively energizing the run winding 14 and the primary and backup brake windings 20 and 21. FIG. 3 is a schematic diagram which shows a control circuit by which an operator manually controls energization of the run winding 14 and the primary and backup brake windings 20 and 21 wherein the brake winding that is energized to electrically brake the alternating current motor is manually selected. If the selected brake winding burns out, the operator must manually switch to a backup brake winding, since there is no automatic changeover from one brake winding to another if the selected brake winding fails.

As shown in FIG. 3, a three-phase source (not shown) is connected to lines 22, 23, 24. The windings L1, L2, L3 of the run winding 14 are connected to the lines 22, 23, 24 when the operator manually activates a momentary start switch 25.

Specifically, closure of the momentary start switch 25 completes a circuit from the line 22 through a normally closed stop switch 26, the momentary start switch 25, the coil of a motor contactor M and normally closed contacts OL1 of an overload relay OL to the line 23. Consequently, the motor contactor M coil is energized so as to close the normally open contacts M1 through M4. Closure of the normally open contacts M2-M4 completes circuits from the three-phase source through the lines 22, 23, 24 and the overload relay OL to the windings L1, L2, L3 of the run winding 14, respectively. This energizes the run winding 14 to cause the rotor 15 to rotate. The normally open contacts M1 are holding contacts for the motor contactor M coil so that release of the momentary start switch 25 will not cause deenergization of the run winding 14. If the alternating current motor were to overload, the overload relay OL would be activated to open the normally closed contacts OL1 so as to de-energize the motor contactor M coil, and the contacts M2-M4 would open to cause de-energization of the run winding 14.

The operator determines which of the primary and backup brake windings 20 and 21 will be energized to provide the braking effect by positioning a double-pole, double-throw switch 27 as shown in FIG. 3. If the double-pole, double-throw switch 27 is thrown into contact with the terminals 40 and 41, the primary brake winding 20 will be energized. On the other hand, if the double-pole, double-throw switch 27 is thrown into contact with the terminals 42 and 43, the backup brake winding 21 will be energized.

Having positioned the double-pole, double-throw switch 27 as desired, the operator electrically brakes the alternating current motor by manually activating the stop switch 26 so as to open the aforementioned circuit through the holding contacts M1 to de-energize the motor contactor M coil which in turn disconnects the run winding 14 from the three-phase source. Activation of the stop switch 26 also completes a circuit from the line 23 through the stop switch 26, the double-pole, double-throw switch 27 and the selected primary or backup brake winding 20 or 21 to the line 24. If, for example, the operator has selected the primary brake winding 20, a circuit is completed from the line 23 through the stop switch 26, the double-pole, double-throw switch 27, the terminal 41, a thermal overload relay TO, the primary brake winding 20, the terminal 40 and the double-pole, double-throw switch 27 to the line 24. If, during the braking operation, the winding 20 should fail, the operator can throw the double-pole, double-throw switch 27 into contact with the terminals 42 and 43 to energize the backup brake winding 21 through a circuit from the line 23 through the stop switch 26, the double-pole, double-throw switch 27, the terminal 43, the thermal relay TO, the backup brake winding 21, the terminal 42 and the double-pole, double-throw switch 27 to the line 24. The thermal overload relay TO opens the circuit which energizes the selected brake winding if the motor overheats.

Another control circuit for selectively energizing the run winding 14 and the primary and backup brake windings 20 and 21 is shown in the schematic diagram of FIG. 4. FIG. 4 shows a control circuit wherein an automatic changeover from the primary brake winding 20 to the backup brake winding 21 occurs if the primary brake winding 20 fails.

As shown in FIG. 4, the operator manually activates the momentary start switch 25 to energize the run winding 14. Activation of the momentary start switch 25 completes a circuit from the line 22 through the normally closed stop switch 26, the momentary start switch 25, the coil of the motor contactor M and the normally closed contacts OL1 of the overload relay OL to the line 23. This energizes the motor contactor M coil such that the normally open contacts M2-M4 of the motor contactor M connect the lines 22, 23, 24 from the three-phase source through the overload relay OL to the windings L1, L2, L3, respectively. As before, the holding contacts M1 are provided for the motor contactor M coil so that the windings L1, L2, L3 of the run winding 14 continue to be energized after the operator releases the momentary start switch 25. If the alternating current motor were to overload, the overload relay OL would be activated to open the normally closed contacts OL1 so as to de-energize the motor contactor M coil, and the contacts M2-M4 would open to cause de-energization of the run winding 14.

When the operator desires to brake the alternating current motor, he activates the stop switch 26 so as to open the aforementioned circuit through the holding contacts M1 to de-energize the motor contactor M coil which in turn disconnects the run winding 14 from the three-phase source. Activation of the stop switch 26 also completes a circuit to energize a time delay relay 28, which may be a Potter and Brumfield CUF4170121 relay that is manually adjusted to set a predetermined time for braking the alternating current motor. For example, the time delay is preferably preset at approximately three seconds.

A sensor coil 30 is interwound with the primary brake winding 20 in certain of the slots $13_1$, $13_3$, ... $13_{35}$ of the stator core of stator 10 in such a way that the primary brake winding 20 induces current in the sensor coil 30 so as to energize the coil of a changeover relay C. The changeover relay C has normally closed contacts C1 so as to provide switchover from the primary brake winding 20 to the backup brake winding 21 in the event that the primary brake winding 20 fails as will become clear from the following description.

Upon activation of the stop switch 26, a circuit is completed from the line 24 through the line 29, the thermal overload relay TO, the primary brake winding 20, the normally closed contacts 32 of the time delay relay 28, the line 33, a line 37 and the stop switch 26 to the line 23. This energizes the primary brake winding 20 so as to rapidly decelerate the rotor 15.

If the primary brake winding 20 fails, since the sensor coil 30 is interwound with the primary brake winding 20, the sensor coil 30 also fails. This de-energizes the changeover relay C coil so that the normally closed contacts C1 close. This automatically switches from the primary brake winding 20 to the backup brake winding 21. Specifically, the thermal overload relay TO opens the circuit to the primary brake winding 20. Moreover, since the normally closed contacts C1 close, a circuit is completed from the line 23, through the stop switch 26, the line 37, the line 34, the normally closed contacts C1, the thermal overload relay TO, the backup brake winding 21, the normally closed contacts 35 of the time delay relay 28 and the lines 36 and 29 to the line 24. This energizes the backup brake winding 21 to rapidly decelerate the rotor 15.

Preferably, when the control circuit is configured to automatically change over from the primary brake winding 20 to the backup brake winding 21, indicator means, such as neon cartridges 44 and 45, are provided to display to the operator which of the brake windings is applying the braking effect. In the control circuit shown in FIG. 4, for example, the neon cartridge 45 is illuminated rather than the neon cartridge 44 to inform the operator that the primary brake winding 20 has failed such that replacement of primary brake winding 20 may be scheduled during a normal downtime or maintenance period for the alternating current motor.

Either of the control circuits in FIGS. 3 and 4 can be slightly modified to allow the operator to jog the alternating current motor. This is accomplished as shown in FIG. 5. Specifically, the circuit in FIG. 5 is substituted for a portion of the control circuits surrounded by phantom lines in FIGS. 3 and 4. In order to jog the alternating current motor, the operator activates a jog switch 38 to the phantom line position shown in FIG. 5 to energize the run winding 14. To then stop the alternating current motor, the operator releases the jog switch 38 which returns to the solid line position shown in FIG. 5 to apply a braking effect. In this way the operator is able to inch the alternating current motor.

It will be appreciated that the present invention provides an electrically braked alternating current motor with plural, alternatively energizable brake windings, each capable of braking the motor. The present invention provides a first, or primary, brake winding and at least a second, or backup, brake winding which are alternatively energizable. The brake winding may either be selected manually such that when one brake winding fails the operator switches over to another brake winding or automatic changeover from one brake winding to another brake winding may be provided.

While the detailed description has been concerned with an electrically braked alternating current motor with two brake windings, it will be appreciated by those skilled in the art that, in accordance with the present invention, any number of backup brake windings may be provided such that the advantage of extended life for an electrically braked alternating current motor is achieved. Other modifications with respect to an electrically braked alternating current motor with plural brake windings and control circuits therefore will be apparent to those of skill in the art without departure from the scope of the present invention. Applicants, therefore, intend to be bound only by the appended claims.

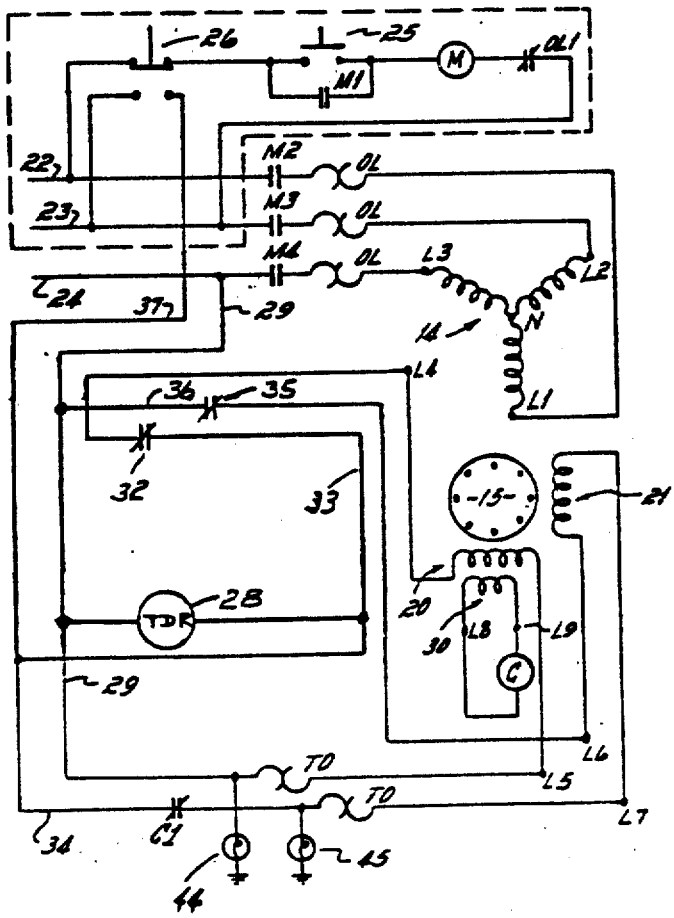

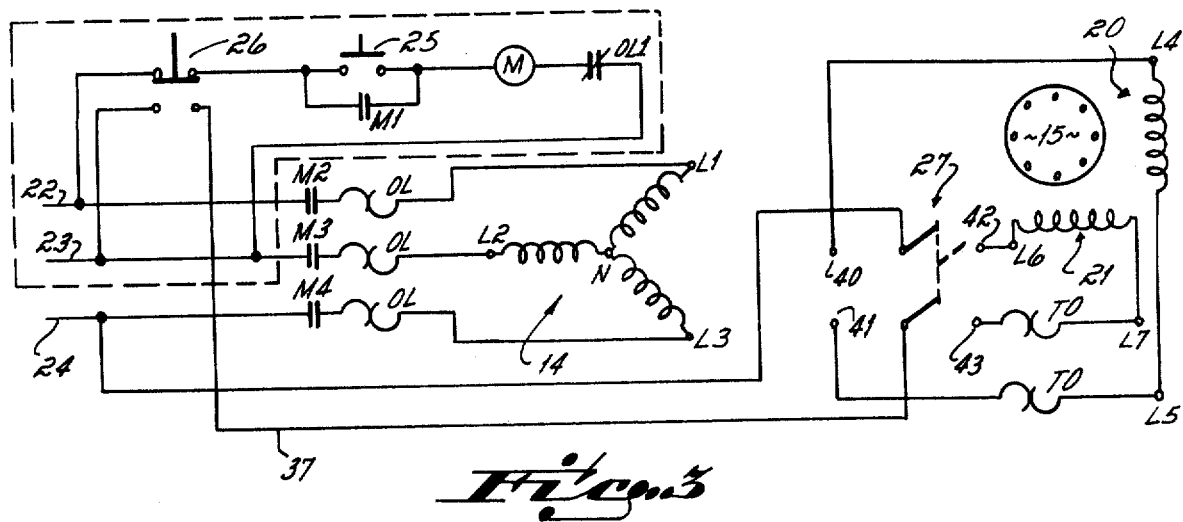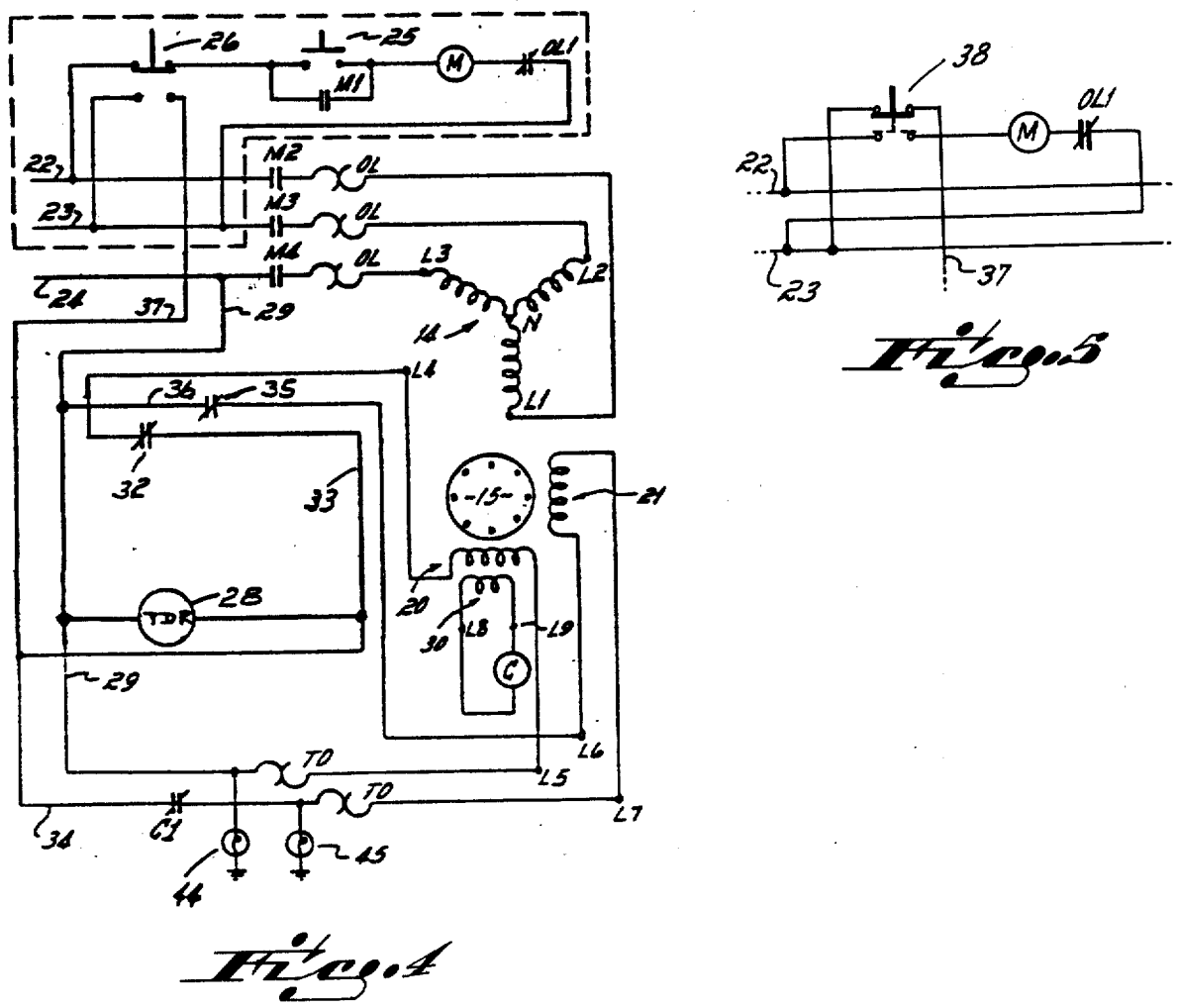

We claim:

1. An electrically braked alternating current motor comprising:
   a stator;
   a selectively energizable run winding wound on said stator and arranged to form a given number of poles;
   a first selectively energizable brake winding wound on said stator and arranged to form a greater number of poles than said given number;
   at least a second selectively energizable brake winding wound on said stator and arranged to form a greater number of poles than said given number;
   each of said brake windings, when energized, being capable of braking said motor;
   a sensor coil responsive to current induced therein by said first brake winding and wound on said stator with said first brake winding such that said sensor coil fails when said first brake winding fails;
   a rotor rotatably mounted with respect to said stator;
   a winding on said rotor;
   a first circuit control means for selectively energizing said run winding, said stator driving said rotor for rotation when said run winding alone is energized; and
   a second circuit control means for alternatively selectively energizing one of said first and second brake windings, said stator electrically braking said rotor when one of said first and second brake windings is energized;
   said second circuit control means including a changeover relay under control of said sensor coil for automatically switching from said first brake winding to said second brake winding when said first brake winding fails.

2. The electrically braked alternating current motor in claim 1 further including indicator means responsive to energization of said first and second brake windings for displaying which of said first and second brake windings is energized.

3. In an electrically braked alternating current motor, including a stator having a selectively energizable run winding wound thereon and arranged to form a given number of poles, a rotor rotatably mounted with respect to said stator and having a winding thereon, and a first circuit control means for selectively energizing said run winding, said stator driving said rotor for rotation when said run winding alone is energized, and further including a braking means, including a selectively energizable primary brake winding wound on said stator and arranged to form a greater number of poles than said given number and a second circuit control means for selectively energizing said primary brake winding, said stator electrically braking said rotor when said primary brake winding is energized, the improvement in said braking means comprising:
   at least one selectively energizable backup brake winding wound on said stator and arranged to form a greater number of poles than said given number;
   said backup brake winding, when energized, being capable of braking said motor;
   a sensor coil responsive to current induced therein by said primary brake winding and wound on said stator with said primary brake winding such that said sensor coil fails when said primary brake winding fails; and circuit means included in said second circuit control means for alternatively selectively energizing one of said primary and backup brake windings, said stator electrically braking said rotor when one of said primary and backup brake windings is energized;

said circuit means including a changeover relay under control of said sensor coil for automatically switching from said primary brake winding to said backup brake winding when said primary brake winding fails.

4. The electrically braked alternating current motor in claim 3 further including indicator means responsive to energization of said primary and backup brake windings for displaying which of said primary and backup brake windings is energized.

5. An electrically braked alternating current induction motor comprising:

a stator having a stator core with a plurality of slots therein;

a selectively energizable run winding wound in said plurality of slots and arranged to form a given number of poles;

a first selectively energizable brake winding wound in said plurality of slots and arranged to form a greater number of poles than said given number;

at least a second selectively energizable brake winding wound in said plurality of slots and arranged to form a greater number of poles than said given number;

each of said brake windings, when energized, being capable of braking said motor;

a sensor coil responsive to current induced therein by said first brake winding and wound on said stator with said first brake winding such that said sensor coil fails when said first brake winding fails;

a first circuit control means for selectively energizing said run winding;

a second circuit control means for alternatively selectively energizing one of said first and second brake windings;

a rotor rotatably mounted within said stator and having a rotor core; and a squirrel cage winding comprising conductors disposed on the rotor core around the periphery thereof and interconnected at the ends of said rotor;

said stator by magnetic induction driving said rotor for rotation when said run winding alone is energized and electrically braking said rotor when one of said first and second brake windings is energized;

said second circuit control means including a changeover relay under control of said sensor coil for automatically switching from said first brake winding to said second brake winding when said first brake winding fails.

6. The electrically braked alternating current motor in claim 5 further including indicator means responsive to energization of said first and second brake windings for displaying which of said first and second brake windings is energized.

7. In an electrically braked alternating current induction motor, including a stator having a stator core with a plurality of slots therein and having a selectively energizable run winding wound in said plurality of slots and arranged to form a given number of poles, a rotor rotatably mounted within said stator and having a rotor core with a squirrel cage winding comprising conductors disposed on said rotor core around the periphery thereof and interconnected at the ends of said rotor, and first circuit control means for selectively energizing said run winding, said stator by magnetic induction driving said rotor for rotation when said run winding alone is energized, and further including a braking means, including a selectively energizable primary brake winding wound in said plurality of slots and arranged to form a greater number of poles than said given number and a second circuit control means for selectively energizing said primary brake winding, said stator by magnetic induction electrically braking said rotor when said primary brake winding is energized, the improvement in said braking means comprising:

at least one selectively energizable backup brake winding wound in said plurality of slots and arranged to form a greater number of poles than said given number;

each of said brake windings, when energized, being capable of braking said motor;

a sensor coil responsive to current induced therein by said primary brake winding and wound on said stator with said primary brake winding such that said sensor coil fails when said primary brake winding fails; and circuit means included in said second circuit control means for alternatively selectively energizing one of said primary and backup brake windings, said stator by magnetic induction electrically braking said rotor when one of said primary and backup brake windings is energized;

said circuit means including a changeover relay under control of said sensor coil for automatically switching from said primary brake winding to said backup brake winding when said primary brake winding fails.

8. The electrically braked alternating current motor in claim 7 further including indicator means responsive to energization of said primary and backup brake windings for displaying which of said primary and backup brake windings is energized.

* * * * *

UNITED STATES PATENT AND TRADEMARK OFFICE
CERTIFICATE OF CORRECTION

PATENT NO. : 4,217,532

DATED : August 12, 1980

INVENTOR(S) : Robert L. Alfieri, et al

It is certified that error appears in the above—identified patent and that said Letters Patent is hereby corrected as shown below:

Column 1, line 31, delete "motor" (1st occurrence).

The title page and sheet 2 of the drawings should be deleted to insert the attached title page and sheet of drawing therefor.

Signed and Sealed this

Seventh Day of April 1981

[SEAL]

Attest:

RENE D. TEGTMEYER

Attesting Officer     Acting Commissioner of Patents and Trademarks

United States Patent [19]

Alfieri et al.

[11] 4,217,532
[45] Aug. 12, 1980

[54] ELECTRICALLY BRAKED ALTERNATING CURRENT MOTOR WITH PLURAL, ALTERNATIVELY ENERGIZABLE BRAKE WINDINGS

[76] Inventors: Robert L. Alfieri, 6123 Cambridge Ave., Cincinnati, Ohio 45230; James D. Grice, 4452 Greenwich Village Ave., Dayton, Ohio 45406; William D. Greene, 5430 David Dr., Tipp City, Ohio 45371

[21] Appl. No.: 877,954
[22] Filed: Feb. 15, 1978
[51] Int. Cl.² .............................................. H02P 1/40
[52] U.S. Cl. .............................................. 318/759
[58] Field of Search ............... 318/757, 759, 563, 564, 318/751

[56] References Cited

U.S. PATENT DOCUMENTS

| | | | |
|---|---|---|---|
| 2,828,457 | 3/1958 | Noodleman | 318/759 |
| 2,906,935 | 9/1959 | Martin | 318/759 |
| 3,335,347 | 8/1967 | Carlstedt | 318/751 |
| 3,462,660 | 8/1969 | Barltrop | 318/564 |

Primary Examiner—Gene Z. Rubinson
Attorney, Agent, or Firm—Wood, Herron & Evans

[57] ABSTRACT

An electrically braked alternating current motor includes a first, or primary, brake winding that is normally energizable to brake the motor and at least a second, or backup, brake winding that is alternatively energizable with the first brake winding to electrically brake the motor if the first brake winding fails.

8 Claims, 5 Drawing Figures